United States Patent [19] [11] 3,906,787
Wingbermuhle [45] Sept. 23, 1975

[54] TORQUE-MEASURING COUPLING

[75] Inventor: Berthold Wingbermuhle, Bad Homburg, Germany

[73] Assignee: P.I.V. Antrieb Werner Reimers Kommanditgesellschaft, Bad Homburg, Germany

[22] Filed: Apr. 15, 1974

[21] Appl. No.: 460,989

[30] Foreign Application Priority Data
Apr. 21, 1973 Germany............ 2320309

[52] U.S. Cl............................................. 73/136 A
[51] Int. Cl.²........................................... G01L 3/10
[58] Field of Search........... 73/136 A, 136 B, 136 C

[56] References Cited
UNITED STATES PATENTS
2,732,713 1/1956 Willits................. 73/136 A
FOREIGN PATENTS OR APPLICATIONS
862,462 3/1961 United Kingdom............... 73/136 A
984,540 2/1965 United Kingdom............... 73/136 A
1,063,829 3/1967 United Kingdom............... 73/136 A Primary Examiner—Charles A. Ruehl

[57] ABSTRACT

For measuring the torque in a shaft, two flanges are secured on the shaft on opposite sides of the area of the shaft in which the torque occurs. Each flange has two parts located on opposite sides of the shaft and protruding in the axial direction of the shaft towards the other flange. The two protruding parts of each flange carry, on the sides facing the protruding parts of the other flange, core halves. Oscillators of different frequency are constituted by coils located in the air gaps between the pairs of core halves as frequency-controlling components, so that torque applied to the shaft causes the air gaps to vary in opposite directions and thus changes the inductances of the coils and the frequency of the oscillators. An electronic switch has its input connected to one of the oscillators and is connected to the second oscillator to open and close in synchronism with the frequency of the second oscillator. The output of the switch is connected to a rotating measurement rotary transmitter, which emits a signal corresponding to the torque-proportional differential frequencies of the two oscillators. The output of the rotating measurement rotary transmitter is connected to a filter which filters out the torque-proportional differential frequency of the two oscillators.

4 Claims, 3 Drawing Figures

TORQUE-MEASURING COUPLING

BACKGROUND OF THE INVENTION

1. Field of the Invention

The invention relates to a torque-measuring coupling in which, by means of the relative twisting of two flanges, which are arranged on the drive-input and drive-output sides of a shaft, the air gaps of coil cores fixed on the flanges are varied and thus a measurement of the torque is obtained.

2. The Prior Art

In one such known arrangement for the inductive measurement of the torsion of a rotating shaft, a choke formed as a double transformer is used which is fed from the line on the primary side in series connection. The secondary windings are connected in opposition. If the two air gaps are of equal size, then the voltages induced in the secondary windings cancel one another. If by torsion on the shaft one air gap is enlarged and the other reduced, a differential voltage occurs on the secondary side. After filtration and rectification, this voltage is fed to an indicator instrument and indicates the torsion or the torque. In this circuit arrangement, which is known from the "Archiv fur technisches Messen," V 136-2, August 1938, it is a disadvantage that slip rings have to be used for the transmission of the feed voltage for the primary side of the double transformer and for the transmission of the voltage induced in the secondary windings back from the rotating part to the stationary part for giving an indication. These slip rings are not especially suitable for long-term operation.

The purpose of the torque-measuring coupling is, first, the torque-proportional displacement of the two flanges of the coupling in relation to one another, and, secondly, on the electrical side to detect the displacement of the two coupling parts in relation to one another and convert it into an electric signal.

SUMMARY OF THE INVENTION

Especially in a torque-measuring coupling of the kind discussed above, it is the purpose of the invention to make it possible to do without the use of slip rings, to make the signal generation more sensitive and nevertheless to keep the necessary expense for the electrical part of the measuring coupling as low as possible.

According to the invention, this problem is solved in that two coils are provided as frequency-controlling components in two oscillators of different frequencies, in that the inductances are varied in opposite directions according to the torsion of the shaft by means of the air gap variation of the coil cores, in that an electronic switch is provided which in synchronism with one oscillation circuit frequency switches the other oscillation circuit frequency on to the primary side of a rotating measurement rotary transmitter and in that on the secondary side the torque-proportional differential frequency of the two oscillators is filtered out of the transmitted voltage by means of a filter.

In the transmission of a torque through the shaft, flanges arranged at some distance from one another on the shaft are twisted in relation to one another and thus the air gaps of the two coils are varied in opposite directions. Correspondingly the inductances also vary in opposite directions. Since the two inductances are the frequency-controlling parts of two oscillators, their frequencies are dependent upon the torque with which the torque-measuring coupling is loaded. With the oppositely directed variation of the two inductances, the frequencies of the oscillation circuits likewise vary in opposite directions. In an advantageous manner in accordance with the invention a differential frequency is formed from the two different oscillation circuit frequencies. Thus the effect of tolerances of the electronic components and the non-linearity of the dependence between the frequency and the inductance or the inductance and the air gap of the coil is largely suppressed. By the use of a measurement rotary transmitter the use of slip rings is advantageously avoided.

According to an advantageous embodiment of the invention, the coils are arranged in shell cores of which in each case one half is secured on one flange and the other half on the other flange. The air gaps, which vary in opposite directions with the twisting of the flanges in relation to one another, are between the mutually opposite shell core halves in each case.

The torque-measuring coupling may comprise a shaft having a measuring part of smaller cross-section, called a torsion piece, the flanges being provided on parts of larger cross-section.

An advantageous embodiment of the measuring coupling according to the invention is one in which on one flange there is provided a secondary winding of a feed voltage transmitter which supplies the oscillators and the electronic switch with voltage, while the primary coil is fitted on the stationary housing. Thus in an advantageous manner the feed voltage is also supplied without slip rings to the rotating electric circuit. Of course it would also be possible to take the feed voltage for the rotating electric circuit from a battery, which however somewhat complicates the readiness for operation and the maintenance.

According to a further advantageous development of the measuring coupling in accordance with the invention, the frequency of the oscillators is selected in such a way that in the working range the amount of the differential frequency is smaller than either of the two individual frequencies.

According to a practical embodiment of the measuring coupling, the frequency of one untuned oscillation circuit is selected at 150 kHz and the frequency of the other at 130 kHz.

BRIEF DESCRIPTION OF THE DRAWINGS

The assembly and the manner of operation of the torque-measuring coupling are to be explained in greater detail by means of the following description. In detail in the Figures.

DESCRIPTION OF THE PREFERRED EMBODIMENTS

Figure 1:
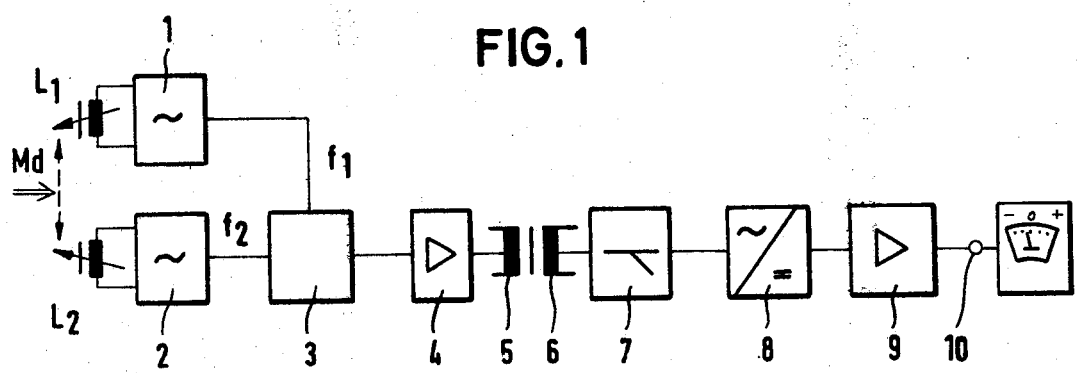
FIG. 1 shows a block circuit diagram of the circuit arrangement according to the invention.

In the block circuit diagram as illustrated in FIG. 1, a first oscillator 1 is equipped with a variable inductance L1 and a second oscillator 2 is equipped with a second variable inductance L2. The two variable inductances L1 and L2, together with suitably selected, constant capacitances, determine the frequencies $f1$ and $f2$ of the two oscillators 1 and 2.

The two inductances L1 and L2 are varied in opposite directions by the torque $Md$ transmitted through the shaft. Thus the two frequencies $f1$ and $f2$ vary likewise in opposite directions. In a practical embodiment, for the torque $Md = 0$, the frequency $f1$ of the oscillator 1 is selected as 150 kHz and the frequency $f2$ of the oscillator 2 as 130 kHz. These two frequencies are fed to an electronic switch 3. This switch can also be called a frequency mixer stage in which, in synchronism with the oscillator alternating-current voltage with the frequency $f1$, the alternating-current voltage of the oscillator 2 with the frequency $f2$ is switched on during one-half cycle of $f1$ and off during the other half-cycle and fed through an amplifier 4 to the primary coil 5 of a rotating measurement rotary transmitter.

This may be a transformer for the measured signals (frequencies). One coil 5 rotates with the shaft 11 on which it is secured. The other coil of this transformer or transmitter is stationary, being secured to the housing. The signals are transmitted inductively with the rotation of the shaft 11 together with the coil 5. Such a type of rotary transmitter is shown in FIG. 1 of U.S. Pat. No. 2,531,228, the disclosure of which is incorporated in here in toto by reference.

The voltage induced in the secondary coil 6 of the measurement rotary transmitter is fed through a filter 7 to a demodulator 8 and converted into a measurement direct-current voltage. This voltage can be passed, possibly amplified through a further amplifier 9, to a measurement instrument 10, where then the desired torque-proportional measurement voltage is indicated.

According to the invention the differential frequency of the two oscillators, that is, in the practical embodiment, the difference between the higher oscillator frequency $f1$ and the lower oscillator frequency $f2$, is filtered out of the frequency mixture produced in the electronic switch 3, by means of the rotary transmitter 5, 6 and the adjoining filter 7, which in general is a low-pass or band-pass filter, and subsequently demodulated. The oscillator frequencies are here so selected that the amount of the differential frequency is less than that of any other occurring frequency.

Figure 2:
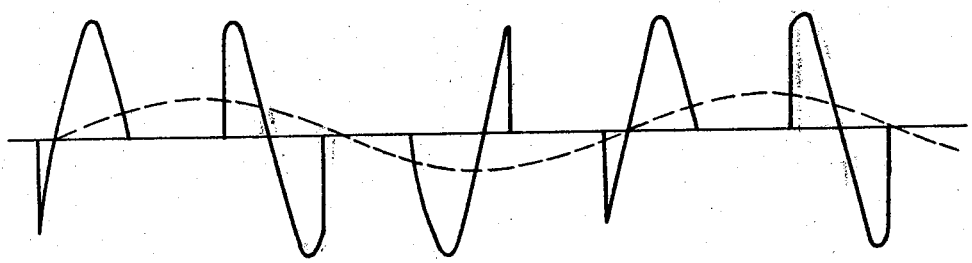
FIG. 2 shows diagrammatically the alternating-current voltage at the output of the electronic switch.

FIG. 2 shows in solid lines the alternating-current voltage at the output of the electronic switch 3. The gaps between these voltage curve parts shown in solid lines are due to the fact that the voltage of the oscillator 2 with the frequency $f2$ is interrupted or suppressed in synchronism with the switching frequency $f1$. The broken-line curve shows, in comparison therewith, the alternating-current voltage at the output of the filter 7, that is to say that this is the desired measured value curve with the torque-proportional frequency.

Figure 3:
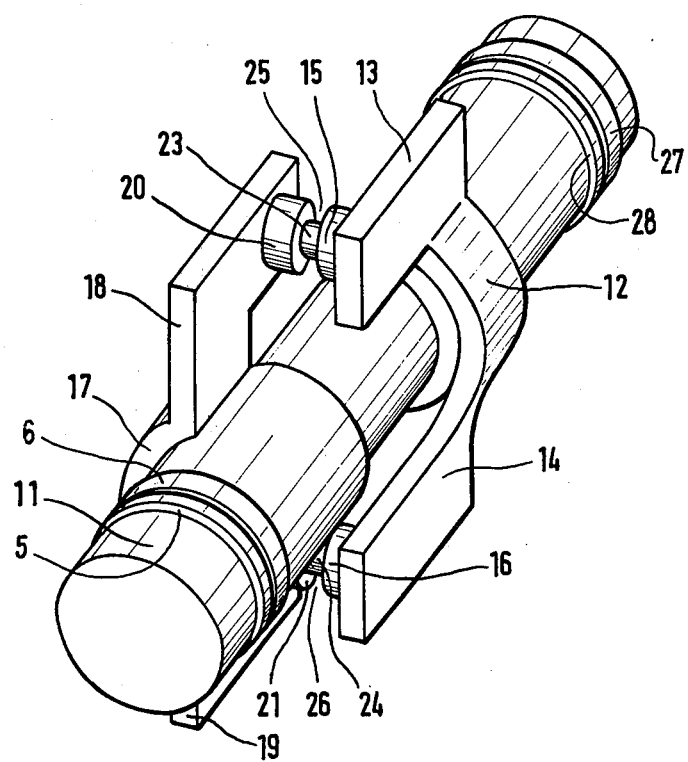
FIG. 3 shows diagrammatically the arrangement of the two flanges with the shell core halves standing opposite to one another thereon.

FIG. 3 shows diagrammatically the arrangement of the coils and shell core halves on the flanges and their arrangement on a shaft 11. One flange 12 is fixedly connected with the shaft 11, and possesses two parts 13 and 14 protruding in the axial direction of the shaft 11, on each of which a shell core half 15 and 16 respectively is arranged. The second flange 17 is fixedly connected, offset by a certain distance in the axial direction from the flange 12, with the shaft 11 and likewise carries two parts 18 and 19 protruding in the axial direction, which however extend axially in a direction opposite to that of the parts 13 and 14. These two protruding parts 18 and 19 likewise carry shell core halves 20 and 21, which stand exactly opposite in position to the shell core halves 15 and 16 respectively.

The two mutually opposite shell core halves 15 and 20 and the two mutually opposite halves 16 and 21 in each case form a cylindrical space in which there is accommodated a coil 23 and 24 respectively. Each of these coils is allocated to one of the oscillators 1 and 2 in FIG. 1. Between the two coil core halves 15 and 20 and between 16 and 21 there is an air gap 25 and 26 respectively. Thus the shell core halves arranged on one flange, for example the shell core halves 15 and 16 on the flange 12, are symmetrically located about a plane radial to the center of the shaft 11, opposite to the corresponding shell core halves 20 and 21 of the other flange 17, the securing point of which is spaced in the axial direction of the shaft 11 from the corresponding securing point of the flange 12. This arrangement of the shell core halves of one flange on one side of the plane and the arrangement of the other shell core halves on the other side of this plane achieves the object that the air gaps 25 and 26 of the two coils 23 and 24 vary in opposite direction when the flanges 12 and 17 are turned in relation to one another.

If now the one flange 12 turns in relation to the other flange 17 because of the stressing of the shaft 11 as a result of the transmitted moment, which is the case by reason of their axial spacing, then the distances between the shell core halves 15 and 20 vary, that is the corresponding air gap 25 becomes smaller or larger and in the opposite direction the distance between the shell core halves 16 and 21 varies, that is the air gap 24 becomes larger or smaller respectively. Thus the inductances L1 and L2 as illustrated in FIG. 1 and the frequencies of the oscillators 1 and 2 vary.

The oscillators 1 and 2, the switch 3 and possibly an amplifier 4, also the primary coil 5 of the measurement rotary transmitter are accommodated, together with the coil inductances L1 and L2, in the torque-measuring coupling and turn with the shaft. In order to supply these electric circuits with working voltage, on the shaft adjacent one of the two flanges 12 there is fitted the secondary coil of a rotating transmitter, the primary coil 27 of which is stationarily accommodated on the housing (not shown further in the drawings) and can be connected to line voltage. Likewise accommodated in this housing is the secondary coil 6 of the measurement rotary transmitter, concentrically with the annular primary coil 5 of the measurement rotary transmitter, which is likewise carried by the shaft adjacent the rotating flange 17. The electric components can advantageously be housed on a circuit card which is fixedly mounted on one of the flanges and rotates with the shaft.

By the use in accordance with the invention of the method of difference of the two oscillator frequencies, in an advantageous manner the demands for precision of the electronic components and of the circuit arrangement are reduced, and also the use of frequency-modulated alternating-current voltage renders possible the use of rotary transmitters. There are no demands upon the precision of this transmitter, and slip rings are avoided.

I claim:
1. In combination with a shaft having an area in which torque occurs, two flanges (12, 17) secured on the shaft on opposite sides of the area, each flange hav- ing two parts located on opposite sides of said shaft and protruding in the axial direction of the shaft toward the other flange, the two protruding parts of one flange respectively carrying first and second core halves and the two protruding parts of the other flange respectively carrying third and fourth core halves located opposite to each of the first and second core halves with air gaps therebetween, first and second coils in said air gaps, first and second oscillators of different frequencies respectively comprising said first and second coils as frequency-controlling components, whereby torque applied to said shaft causes said air gaps to vary in opposite directions, thereby changing the inductances of said coils and the frequencies of said oscillators, an electronic switch having its input connected to the first oscillator, and means operatively connecting the electronic switch to the second oscillator to open and close the switch in synchronism with the frequency of the second oscillator, a rotating measurement rotary transmitter, means connecting the output of the switch to said rotating measurement rotary transmitter, the rotating measurement rotary transmitter emitting a signal corresponding to the torque-proportional differential frequencies of the two oscillators, and means connected to the output of the rotating measurement rotary transmitter to filter out the torque-proportional differential frequency of the two oscillators.

2. In a combination as claimed in claim 1, the shaft being narrower in the area between the flanges.

3. In a combination as claimed in claim 1, a feed voltage transmitter for supplying voltage to the oscillators and electronic switch comprising a fixed primary winding and a secondary winding carried by the shaft.

4. In a combination as claimed in claim 1, filter means connected to the output of the rotating measurement rotary transmitter to produce a signal with a frequency substantially less than the frequency of either of said oscillators.

* * * * *